350-96.1 SR
XR 3,104,370
CE SEARCH ROOM
CROSS REFERENCE
ADDED

Sept. 17, 1963 J. RABINOW 3,104,370

RECOGNITION SYSTEMS USING ASSERTIONS AND NEGATIONS

Filed Dec. 15, 1960 2 Sheets-Sheet 1

INVENTOR
JACOB RABINOW
BY Joseph A. Genovese
ATTORNEY

3104370
OR IN 340/146.3R

RECOGNITION SYSTEMS USING ASSERTIONS AND NEGATIONS

Filed Dec. 15, 1960

2 Sheets-Sheet 2

INVENTOR
JACOB RABINOW
BY Joseph A. Genovese
ATTORNEY

Patented Sept. 17, 1963

3,104,370

RECOGNITION SYSTEMS USING ASSERTIONS AND NEGATIONS

Jacob Rabinow, Takoma Park, Md., assignor to Rabinow Engineering Co., Inc., Takoma Park, Md.
Filed Dec. 15, 1960, Ser. No. 76,019
7 Claims. (Cl. 340—146.3)

This invention relates to character recognition techniques and particularly to the use of assertions, negations and weighted positions to facilitate recognition of characters.

This application is a continuation-in-part of my co-pending application Serial No. 698,194, filed on November 22, 1957, and specific reference is made to co-pending application Serial No. 32,911 of J. Rabinow et al., filed on May 31, 1960.

Since this application continues from both of the above applications which are now pending, the pertinent parts of each are incorporated herein by reference. As will be pointed out later, features disclosed in both applications are repeated to the extent necessary for an understanding of the subject matter claimed herein.

As used herein, the term "assertion" is defined as a signal received or derived from an element of an area which contains a portion of a character when that area element is being scanned or read.

The term "negation" is defined as a signal of the same type as an assertion, but which appears when the area being scanned does not contain a portion of the character.

A weighted position is an area element which when scanned is deliberately caused to produce a larger than ordinary signal. The weighted position can result in a larger assertion or negation than would ordinarily be obtained.

The term "character" includes, letters, numerals, pictures, symbols, patterns, and any other mark, line or the like capable of being recognized by machine.

In many character recognition machines, the characters are scanned to provide outputs corresponding to an element-by-element, portion-by-portion or piece-by-piece examination of the character. Some earlier attempts were made to gather the total information of a character as the result of a single image match, but this technique has not been generally adopted in modern, successful character readers.

Regardless of the type of scan, some means are required to process the scan information and base a character identifying decision on the processed information. Some characters have only small distinctions. For instance an "E" and an "F" distinguish from each other only by the lower horizontal bar of the E. Specifically, the "F" is an "E" without the lower horizontal bar, and the "E" is an "F" with the horizontal bar.

The data processing and decision sections of reading machines may erroneously conclude that an E is an F and vice versa, e.g. if background noise is present (smudges on the paper, etc.), vertical registration is poor, if there are minor print imperfections and for other reasons known to those skilled in the art. Also, since the E includes all lines of the F, in some systems the letter E will be indicated as an F because it will actuate all of the elements responsive to an F, unless some special precaution is taken.

An object of this invention is to improve the functioning and reliability of reading machines by basing machine decisions on the detection of elements of the character (assertion) in addition to the detection of the lack of character elements in particular areas (negations).

Another object of the invention is to provide means for reinforcing the evidence on which a decision is made by the weighting principle. In explanation, assume that the machine endeavors to distinguish an "O" and a "Q." The only difference between these characters is the small tail at the lower right corner of the "Q." In such a situation the assertions and the negations of the positions occupied by the tail are given more weight, optically and/or electrically, in the operation of the reading machine.

Other objects and features of importance will become apparent in following the description of the illustrated forms of the invention.

Figures 3, 3A, 3B:
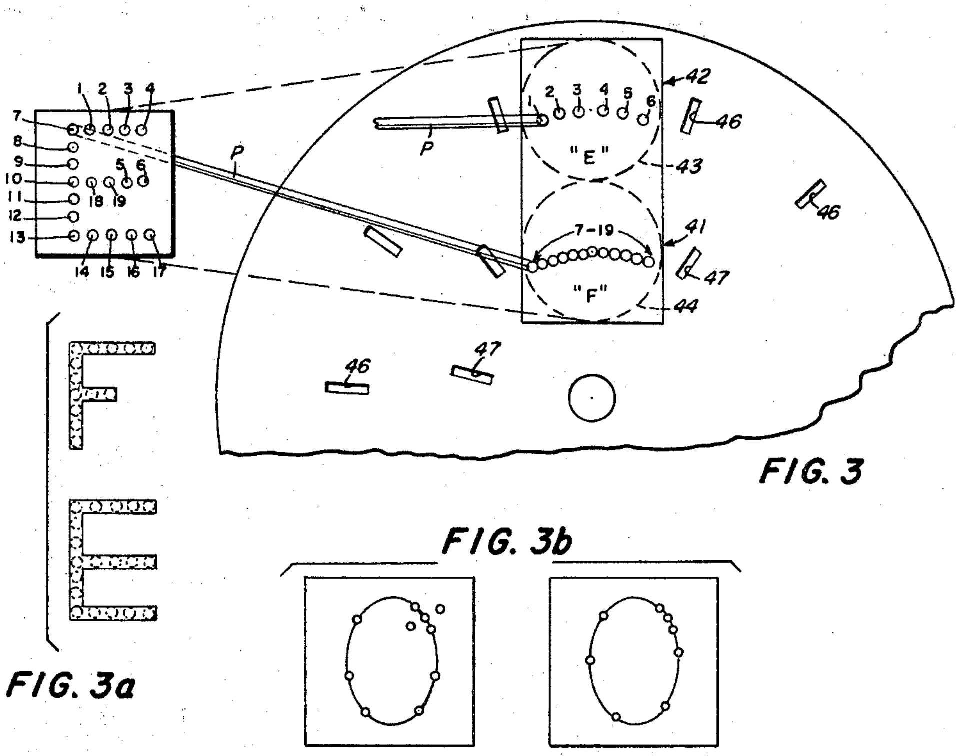
FIGURE 3 is a diagrammatic view virtually copied from the earlier co-pending application and showing a part of a system for the recognition of two illustrated characters.

FIGURES 3*a* and 3*b* are diagrammatic views showing sub area examination of characters.

Figure 4:
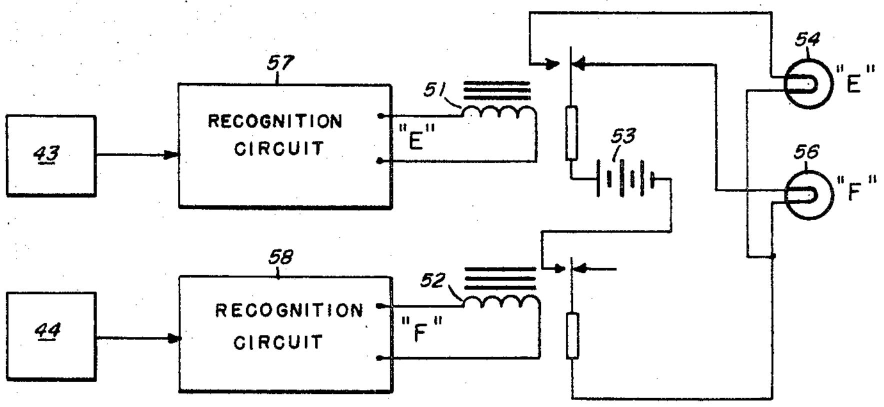

FIGURE 4 is a schematic view showing a circuit arrangement identical to that disclosed in the earlier co-pending application and specifically used in connection with FIGURE 3 herein.

Figure 1:
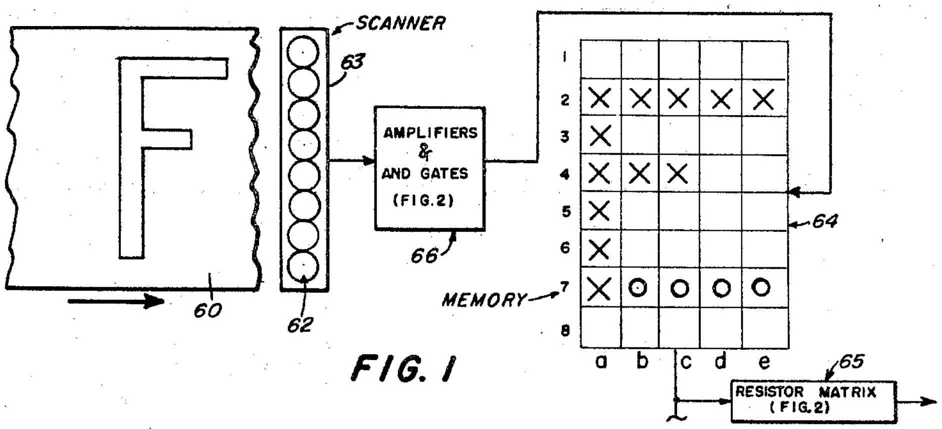
FIGURE 1 is a diagrammatic view showing a principal electrical form of the invention.
Figure 2:
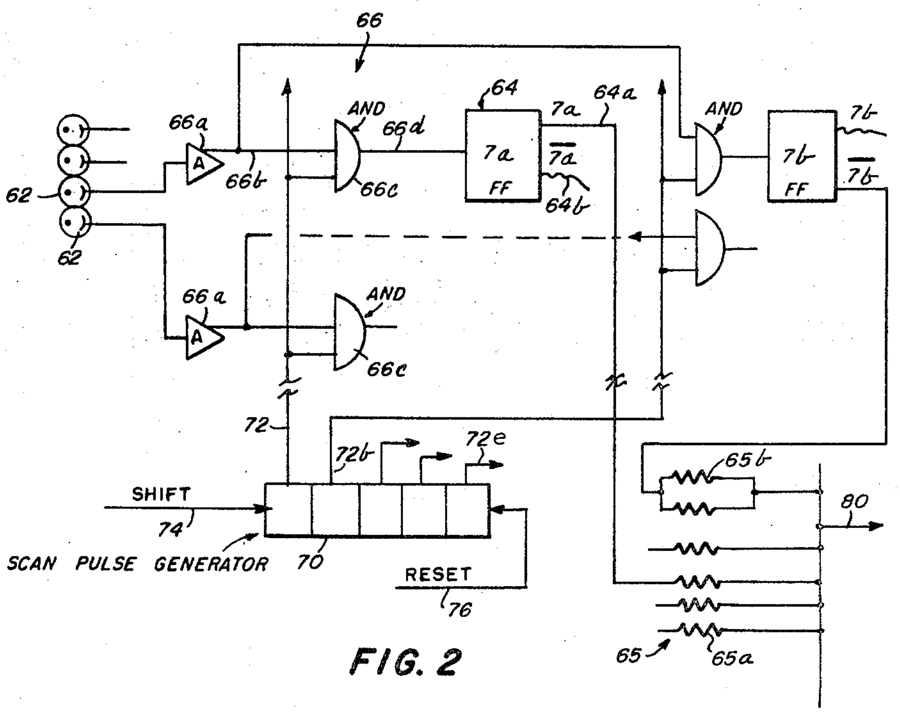
FIGURE 2 is a fragmentary schematic view showing some of the details of the system of FIGURE 1.

Attention is now directed to FIGURES 1 and 2 showing one way of developing and using assertions and negations as well as weighted positions. For simplicity it is assumed that the character F is typed or printed on a white background area 60, and the character and area is scanned by a row of photocells 62 constituting a part of scanner 63. The information gathered by the photocells as the character area 60 moves in the direction of the arrow, is obtained from a systematic investigation of the elemental areas of the area 60, as fully described in application Serial No. 32,911. This information or data is processed by a storage or memory section 64, and the character is identified by the decision section 65. The photocell amplifiers and gating means 66 are fragmentarily shown in FIGURE 4, but a full discussion is found in application Serial No. 32,911.

For a more specific discussion attention is directed to FIGURE 2 showing photocells 62 feeding amplifiers **66*a*, the outputs of which are applied on lines 66*b* as single inputs to AND gates 66*c*. Memory 64 is composed of a plurality of vertical shift registers, the number being the same as the number of vertical scans of the character area 60. Each shift register is composed of a plurality of bistable devices, for instance flip-flops, two of which are identified at 7*a* and 7*b* in FIGURE 2. Each flip-flop has a pair of output wires, for instance wires 64*a* and 64*b*** whose voltage swings between a comparatively high and a comparatively low value depending on the state of the flip-flop. It will subsequently be seen that the state of the flip-flop depends on whether the photocell associated therewith "sees" white or black (a portion of the character or no portion of the character) during the scan.

A scan timing pulse generator 70, for instance a shift register identical to the corresponding shift register in the co-pending application Serial No. 32,911, is used to establish the scan time by providing signals successively on the lines 72–**72*e*. The line 72 furnishes simultaneous inputs to gates 66*c***, while the others of these lines provide simultaneous inputs to the gates associated with shift registers *b*–*e* inclusive of memory 64. The shift pulse line 74 and reset lines 76 are identical to those in the co-pending application.

It is now seen that during a single scan of area 60, those photocells 62 which see white will provide no output, whereas those photocells which see black will provide an output, e.g. on line **66*b*, gated by one AND gate 66*c*, so that a signal will be produced on line 66*d* to set its flip-flop, 7*a*** in this instance. However, the output wires 64a and 64b of flip-flop 7a have two signals available, one the "assertion" and the other "not the assertion," otherwise termed the "negation."

When storage 64 is loaded in the above way, the information therein is interrogated and a decision is made by section 65, fragmentarily shown in FIGURES 1 and 2 but completely discussed in application Serial No. 32,911. That application describes an "absolute" technique decision and a "best of match" technique, the latter of which is partially reproduced herein. As a part of the best of match technique, resistor matrix 65a is shown with a character identifying signal means 80 connected therewith. For the character "F," the assertion wires of the flip-flops marked with an X in FIGURE 1 are connected to resistors of matrix 65a. Following the logic of the negations, we wish to strengthen the decision by requiring that there be nothing corresponding to a lower horizontal bar such as would be found in an "E." Therefore we connect the negation wires of the flip-flops identified by zeros in FIGURE 1 with other resistors of matrix 65a. This has the effect of looking to see that there is no feature of the character in positions 7b, 7c, 7d and 7e. Weighted positions are established electrically by selection of resistor values, and I have illustrated this by showing two resistors 65b paralleled in resistor matrix 65a for flip-flop 7b.

Consider FIGURES 3 and 4. This form of the invention discloses another way of achieving assertions and negations to strengthen the decision function of a character reader. It uses a scanner in the form of a scanning disc which is different from the scanner shown in FIGURES 1 and 2. Further, there is an arrangement of light pipes P, for light conduction, only two of which are shown in FIGURE 3, but the others are implied by illustrations of the ends thereof.

Co-pending application Serial No. 698,194 discusses the weighted position technique by pointing out that it is possible to arbitrarily place more light pipes at points where differences must be studied, and that fewer elements can be used where there are no differences between characters. See the O and Q example of FIGURE 3b herein, copied from the above application.

The assertion and negation technique, called "guard" elements, is disclosed in the description of FIGURES 3 and 4 which are essentially reproduced FIGURES 4 and 7 of co-pending application Serial No. 698,194. The language is as follows: (some numbers changed) FIGURE 3 shows an arrangement of light pipes P where some of the receiving ends are used to match the character and others are used as "guard" elements to detect the simultaneous condition of absence of dark areas outside of the character. The emitter ends are separated into two groups 41 and 42 and are fed to different photocells 43 and 44 respectively so that simultaneous examination can be made of the character which is normally dark and the guard elements which should, at that time, be light. For example, if one desires to distinguish between a capital E and a capital F, the arrangement shown in FIGURE 3 is used and it will be apparent that one can arrange the electronic circuit so that if both photocells 43 and 44 simultaneously receive little light, the letter is read as an E, while if the upper photocell receives a great deal of light while the bottom photocell 44 receives little light, the character is read as an F. The scanning disc, of course, has two sets of slots 46 and 47 respectively so that both emitter groups can be read.

It will be understood that in FIGURE 3 the image is inverted, so that the spots 7 to 19 correspond to the character F, while all of the spots 1–19 correspond to the character E. Thus if each photocell 43 and 44 actuates a relay, in the usual fashion, the circuit will be so arranged that actuation of the relay controlled by the tube 44 while the relay controlled by tube 43 is unactuated will represent an F, and can be used to control the F indicating circuit. Actuation of both relays will indicate an E and can be used to control the E indicating circuit and leave the F circuit unactuated.

FIGURE 4 shows an example of such an arrangement. Photocells 43 and 44 actuate relays 51 and 52 respectively, and are shown in the unactuated position whereas the voltage source 53 (represented as a battery) is not connected to either lamp 54 or 56. When an optical match corresponding to the character F occurs, relay 52 alone is actuated, and it can be readily seen that only signal 56 (corresponding to the character F) will be energized; when an optical match corresponding to the letter E occurs, both relays will be energized, and in that case lamp 56 will remain deenergized, while lamp 54 will be energized. Recognition circuits 57 and 58 may be of any suitable type, for example such as shown in my prior Patent No. 2,795,705 or 2,933,246.

Summarizing some of the aspects of the embodiment in FIGURES 3 and 4, the light pipes P provide an element-by-element examination of the character. The circuit of FIGURE 4 coupled to the scanning system provides either of two outputs. One shows the presence of some detail of a character and the other the absence of this detail. The effect is that the circuit recognizes the "F" on the basis of the "F" features and the negation of the lower horizontal bar and the outer end of the middle bar (positions 1–6) of FIGURE 3.

Various changes, modifications and other deviations from the forms of the invention specifically illustrated herein may be made without departing from the scope of the following claims.

I claim:

1. In a character recognition machine for identifying a character on a background area, a scanner for the area providing outputs in accordance with the shape of the character on the area, electrical circuit means responsive to said outputs for providing a character identification signal on the basis of at least one of said outputs providing a first signal indicating the presence of a portion of the character, and at least one other of said outputs providing a second signal which is indicative of the absence of a portion of a character in a particular part of said area, and means to weight at least one of said information signals to emphasize the importance thereof.

2. In a recognition machine having a scanner providing outputs corresponding to element-by-element investigation of an unknown pattern, memory devices for storing information regarding said outputs, each memory device having a set of conductors providing outputs which are opposite to each other to provide assertions and negations corresponding to each investigated element, at least one conversion means to provide a signal peculiar to the unknown pattern, and means connecting predetermined conductors of said memory devices to said conversion means to provide said signal on the basis of both affirmative detection of features of the pattern and detection of a lack of features at predetermined elemental stations of the pattern, said conversion means being composed of passive elements, and some of said elements having different values to emphasize features or lack of features in a given portion of the unknown pattern.

3. In a reading machine for characters on a contrasting background area, means to examine a character and its background area and provide outputs which correspond to the optical density of sub areas of said area and character, said output providing means associated with one of said sub areas including means for providing an output signal which is weighted by being disproportionate to the optical density and area of said sub area.

4. In a reading machine for characters on a background area; a scanner providing outputs corresponding to the optical density of elemental areas of a character and its background area; means for processing some of said outputs for each character including means to produce an assertion information signal for a given elemental area in response to one of said outputs corresponding to the given elemental area when the output for that area signifies that said given area is occupied by a portion of a character, said processing means also including means to produce a negation information signal for another elemental area in response to another of said outputs when the last-mentioned output signifies that said other elemental area is occupied by a portion of the background area, and means for combining selected assertion and negation signals to provide a character-identity signal.

5. The subject matter of claim 4 and means to weight at least one of said information signals so that the weighted signal contributes more information content to said combining means than would be contributed in the absence of the weighting.

6. In a character recognition machine for a character on a background area, said machine having scanning means to examine subareas of said area including the character, and character identification signal providing means; means to energize said signal providing means in response to predetermined outputs of said scanning means; said energizing means including first means for producing an information assertion signal when at least a part of the scanning means seeks and detects a portion of the character in a given subarea and a different signal when said part of the scanning means fails to detect a portion of the character in the same subarea; second means to produce an information negation signal when at least part of the scanning means seeks and detects a portion of the character background in a given part of the area where a portion of the character is not expected; and at least one of said information signal producing means providing a weighted information signal which is a signal that is larger than a signal produced as a result of the examination of another equal size part of the character of lesser importance in distinguishing the character from another character.

7. In a recognition machine having a scanner providing outputs corresponding to element-by-element investigation of an unknown pattern; memory devices for storing information regarding said outputs, each memory device having a set of conductors, and each memory device providing outputs on said conductors which are opposite to each other to provide assertions and negations corresponding to said investigated elements; a plurality of conversion means, each conversion means providing a signal peculiar to the unknown pattern; and means connecting predetermined conductors of said sets of conductors of said memory devices to said conversion means to enable said conversion means to provide said peculiar signals on the basis of both affirmative detection of features of the unknown pattern and detection of the lack of features at predetermined elemental stations of the pattern.

References Cited in the file of this patent

UNITED STATES PATENTS

| | | |
|---|---|---|
| 2,682,043 | Fitch | June 22, 1954 |
| 2,889,535 | Rochester et al. | June 2, 1959 |
| 2,905,927 | Reed | Sept. 22, 1959 |
| 2,932,006 | Glauberman | Apr. 5, 1960 |